(12) United States Patent
Arimura

(10) Patent No.: US 7,572,387 B2
(45) Date of Patent: Aug. 11, 2009

(54) POLYMER ELECTROLYTE MEDIUM AND DIRECT METHANOL FUEL CELL

(75) Inventor: Tomoaki Arimura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 905 days.

(21) Appl. No.: 11/152,078

(22) Filed: Jun. 15, 2005

(65) Prior Publication Data
US 2006/0068238 A1    Mar. 30, 2006

(30) Foreign Application Priority Data
Sep. 29, 2004  (JP) .............................. 2004-285456

(51) Int. Cl.
*H01G 9/02* (2006.01)
*H01M 8/10* (2006.01)

(52) U.S. Cl. ...................... 252/62.2; 429/33
(58) Field of Classification Search ................ 252/62.2; 429/33, 12–46
See application file for complete search history.

(56) References Cited

U.S. PATENT DOCUMENTS

2006/0088749 A1*   4/2006  Panambur et al. ............. 429/33

FOREIGN PATENT DOCUMENTS

| JP | 2000-223135 A | 8/2000 |
|---|---|---|
| JP | 2003-036864 A | 2/2003 |
| JP | 2004-152615 A | 5/2004 |

* cited by examiner

*Primary Examiner*—Dah-Wei D Yuan
*Assistant Examiner*—Steven Scully
(74) *Attorney, Agent, or Firm*—Pillsbury Winthrop Shaw Pittman, LLP

(57) ABSTRACT

A polymer electrolyte medium expressed by the following formula (I):

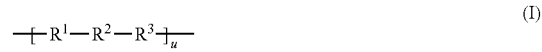

where $R^1$ in the formula represents an aromatic radical-containing functional group, $R^2$ represents an alkyl functional group, $R^3$ represents an ion exchange aromatic functional group, and u represents an integer of 1 to 450.

20 Claims, 2 Drawing Sheets

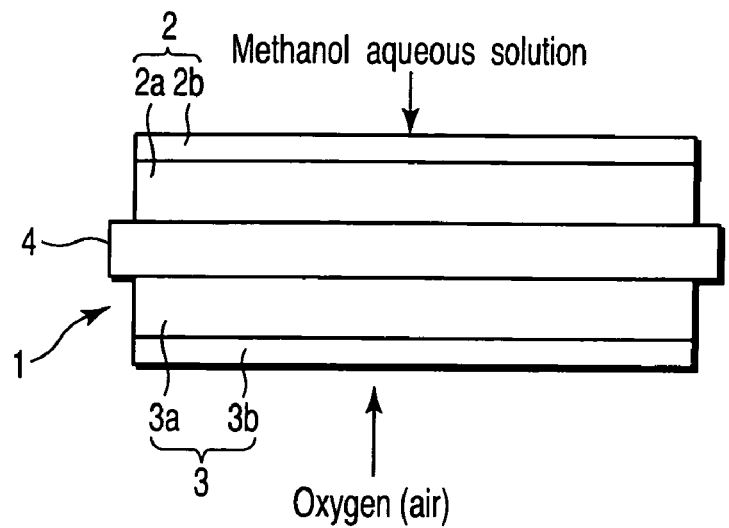
F I G. 1
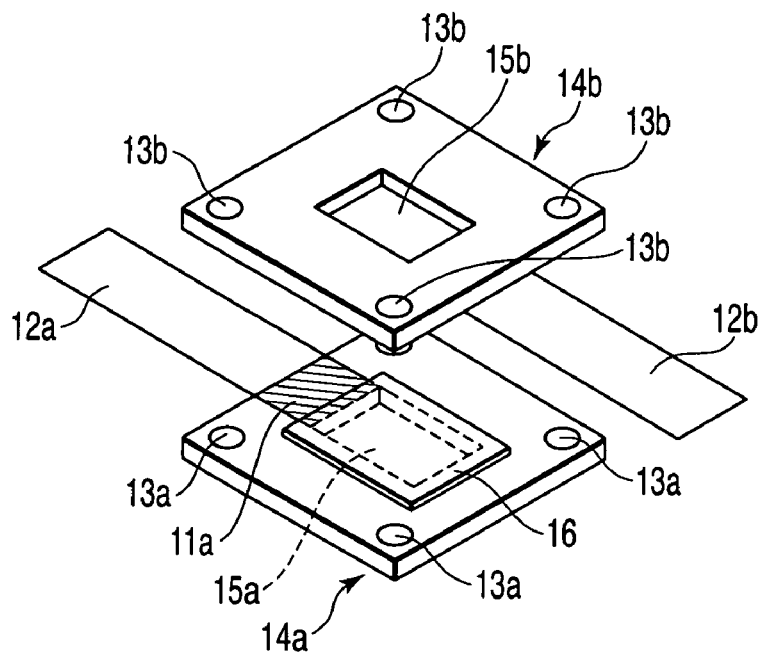
F I G. 2

POLYMER ELECTROLYTE MEDIUM AND DIRECT METHANOL FUEL CELL

CROSS-REFERENCE TO RELATED APPLICATIONS

This application is based upon and claims the benefit of priority from prior Japanese Patent Application No. 2004-285456, filed Sep. 29, 2004, the entire contents of which are incorporated herein by reference.

BACKGROUND OF THE INVENTION

1. Field of the Invention

The present invention relates to a polymer electrolyte medium and a direct methanol fuel cell.

2. Description of the Related Art

As a polymer electrolyte medium (proton conductive film) of a direct methanol fuel cell (DMFC), a perfluoroalkylsulfonic acid film such as a fluorine-based ion exchange film is conventionally used. An example of such a conventionally used film is a product of DuPont, known by its tradename, Nafion.

However, the conventional proton conducting film entails the following drawbacks. That is, the main chain of its polymer contains a fluorocarbon structure, and the film has an affinity for methanol. For this reason, when the fuel cell is in operation, the film is dissolved to deteriorate. Further, the proton conductive film is deteriorated by radical spices created by the electrode reaction while the fuel cell is in operation as well as the electric field. Due to the deterioration of the proton conductive film caused by these factors, crossover of methanol is generated, causing not only a decrease in the methanol use efficiency, but also a decrease in output of the fuel cell. Furthermore, the fluorine-based ion exchange film known as its tradename of Nafion by DuPont is expensive, causing an increase in the production cost of the fuel cell.

On the other hand, Jpn. Pat. Appln. KOKAI Publications No. 2000-223135 and No. 2003-36864 each disclose an improved solid polymer electrolyte film used for a fuel cell. The solid polymer electrolyte film is formed of a main chain consisting of a co-polymer of a fluorocarbon-based vinyl monomer and hydrocarbon-based vinyl monomer, and a hydrocarbon-based side chain including a sulfonic group, and the side chain contains an α-methylstyrene group.

However, even in the solid polymer electrolyte film, the main chain contains a fluorocarbon structure, and the film has an affinity for methanol. For this reason, while the fuel cell is in operation, the film is dissolved to deteriorate. Further, the film is deteriorated by radical spices created by the electrode reaction while the fuel cell is in operation as well as the electric field. As a result, crossover of methanol is generated, causing a decrease in output of the fuel cell.

BRIEF SUMMARY OF THE INVENTION

According to a first aspect of the present invention, there is provided a polymer electrolyte medium expressed by the following formula (I):

(I)

where $R^1$ in the formula represents an aromatic radical-containing functional group, $R^2$ represents an alkyl functional group, $R^3$ represents an ion exchange aromatic functional group, and u represents an integer of 1 to 450.

According to a second aspect of the present invention, there is provided a direct methanol fuel cell comprising:

an anode to which a methanol aqueous solution is supplied;
a cathode to which an oxidizing agent is supplied; and
a polymer electrolyte medium interposed between the anode and cathode and expressed by the following formula (I):

(I)

where $R^1$ in the formula represents an aromatic radical-containing functional group, $R^2$ represents an alkyl functional group, $R^3$ represents an ion exchange aromatic functional group, and u represents an integer of 1 to 450.

BRIEF DESCRIPTION OF THE SEVERAL VIEWS OF THE DRAWING

FIG. 1 is a diagram schematically showing a cell of a cell component section of a direct methanol fuel cell according to the present invention;

FIG. 2 is an exploded perspective view showing a cell for measuring an electro-conductivity used in Example of the present invention.

DETAILED DESCRIPTION OF THE INVENTION

Figure 3:
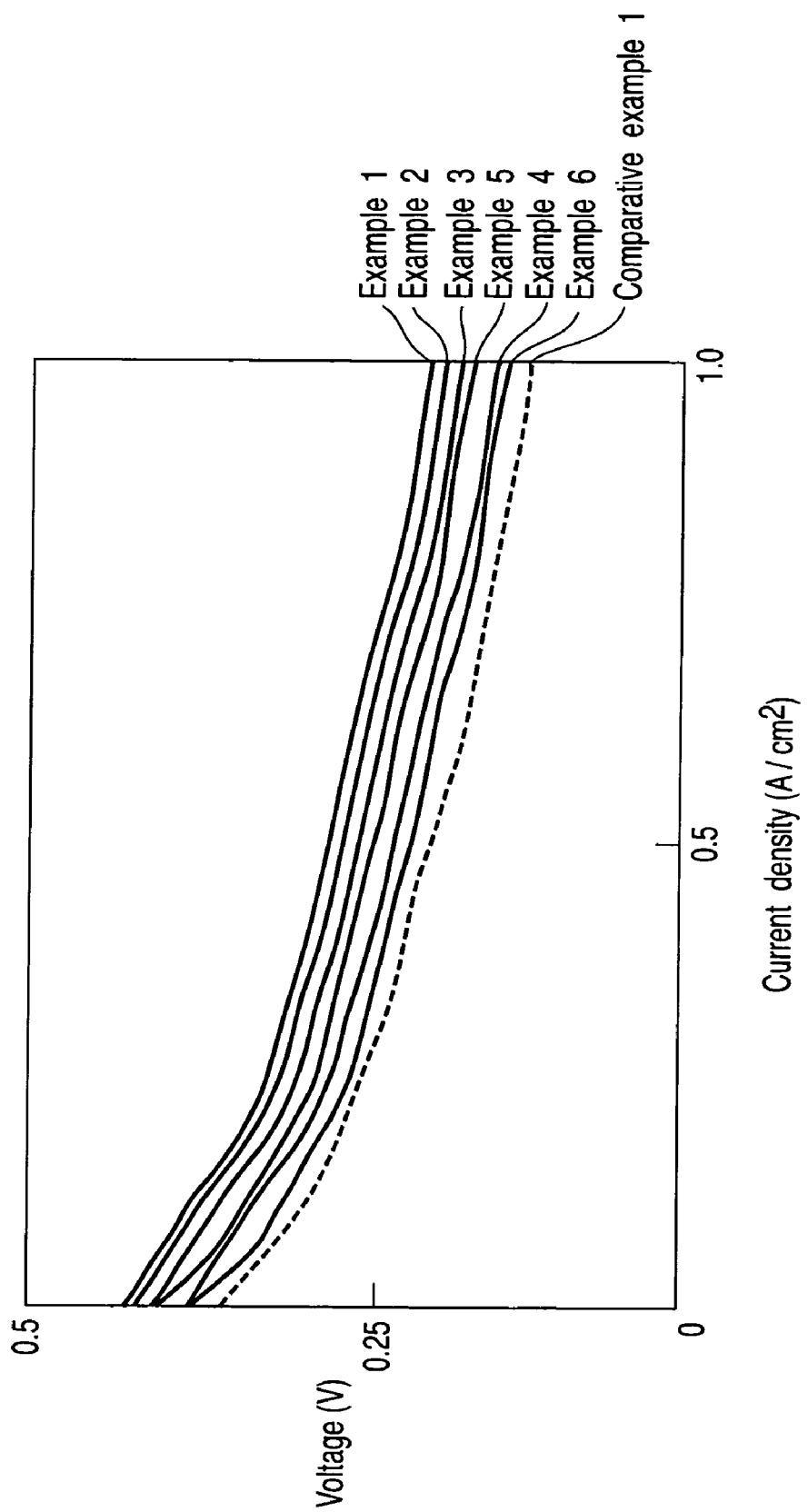
FIG. 3 is a diagram showing current-voltage curves of single cells at a temperature of 70° C. in which polymer electrolyte films of Examples 1 to 6 and Comparative Example 1 are built respectively.

The polymer electrolyte medium and direct methanol fuel cell according to an embodiment of the present invention will now be described in detail.

The polymer electrolyte medium of this embodiment is expressed by the following formula (I):

(I)

where $R^1$ in the formula represents an aromatic radical-containing functional group, $R^2$ represents an alkyl functional group, $R^3$ represents an ion exchange aromatic functional group, and u represents an integer of 1 to 450.

It is preferable that $R^2$ of the formula (I) should be an alkyl functional group having 1 to 30 carbon atoms.

In the formula (I), u should preferably be an integer of 20 to 200.

The polymer electrolyte medium according to this embodiment should preferably be expressed by especially the formulas (II) and (III) provided below.

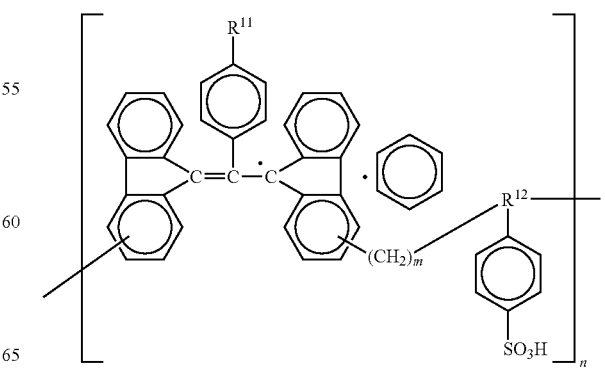

(II)

where $R^{11}$ in the formula represents a hydrogen atom or an alkyl group, $R^{12}$ represents a phenyl group, a naphthyl group or an antryl group, n represents an integer of 1 to 450 and m represents an integer of 1 to 30.

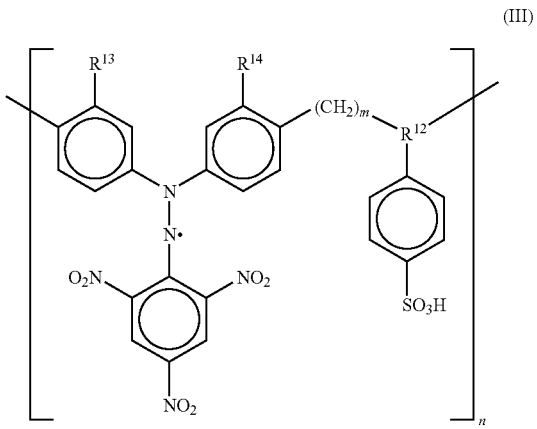

(III)

where $R^{13}$ and $R^{14}$ in the formula represents a hydrogen atom or an alkyl group, and they may be the same or different, $R^{12}$ represents a phenyl group, a naphthyl group or an antryl group, n represents an integer of 1 to 450 and m represents an integer of 1 to 30.

In each of the formulas (II) and (III), the monomer (functional group) shown on the left-hand side corresponds to the aromatic radical-containing functional group of the formula (I), the monomer (functional group) shown at the middle part corresponds to the alkyl functional group of the formula (I), and the monomer (functional group) shown on the right-hand side corresponds to the ion exchange aromatic functional group of the formula (I).

In the formulas (II) and (III), the alkyl groups represented by $R^{11}$, $R^{12}$ and $R^{13}$ each may be of a straight chain or branched chain, and here the straight chain is preferable.

In the formulas (II) and (III), n should preferably be an integer of 20 to 200. Further, in these formulas, m should preferably be an integer of 3 to 20, and more preferably, 3 to 12.

Next, a direct methanol fuel cell according to this embodiment will now be described with reference to accompanying drawings.

FIG. 1 is a diagram schematically showing a cell of a cell component section of the direct methanol fuel cell. A cell 1 includes an anode (fuel electrode) 2 to which a methanol aqueous solution is supplied, a cathode (air electrode) 3 to which an oxidizing agent (e.g., oxygen, air) is supplied, and a polymer electrolyte film 4 interposed between the anode 2 and cathode 3 and serving as the above-described polymer electrolyte medium. The anode 2 includes a catalyst layer 2a provided in contact with the polymer electrolyte film 4 and a diffusion layer stacked on the catalyst layer 2a and containing, for example, carbon paper. The cathode 3 includes a catalyst layer 3a provided in contact with the polymer electrolyte film 4 and a diffusion layer stacked on the catalyst layer 3a and containing, for example, carbon paper.

In the cell of the component section of the direct methanol fuel electrode shown in FIG. 1, the following reactions occur in the anode (fuel electrode) 2 and cathode (air electrode) 3, respectively, which are located on the respective surfaces of the polymer electrolyte film 4, thereby generating electricity.

Anode: $6CH_3OH + H_2O \rightarrow CO2 + 6H^+ + 6e^-$
Cathode: $6H^+ + 3/2O_2 + 6e^- \rightarrow 3H_2O$ As described above, the polymer electrolyte medium according to this embodiment is expressed by the formula (I), in which the medium does not contain a fluorocarbon in its main chain or side chain unlike the conventional material, Nafion, of the 3 groups (monomers) of $R^1$ to $R^3$, $R^1$ and $R^3$ are aromatic functional groups, and the film exhibits a high non-affinity (high resistance) to methanol. Thus, the medium has such a property that it does not easily dissolved into methanol, and therefore, the degradation of the medium caused by methanol can be prevented. In the case where the fuel cell is made to have such a structure that the cell is interposed between the anode and cathode, the aromatic radical-containing functional group of $R^1$ of the formula (I) neutralize radical species created by the electrode reaction while the cell is in operation, and exhibits a high resistance to the electric field created by the electrode reaction. In this manner, the degradation caused by the radical species and electric field can be prevented.

Further, the polymer electrolyte medium according to this embodiment contains an ion exchange aromatic functional group as $R^3$ expressed in the formula (I). With this structure, the medium can exhibit a proton conductivity equal to or higher than that of a conventional perfluoroalkylsulfonic acid film such as Nafion.

Furthermore, in the polymer electrolyte medium according to this embodiment, of $R^1$ to $R^3$ of the formula (I), $R^1$ and $R^3$ are aromatic functional groups. Therefore, the film has a high rigidity and high strength. Further, the group (monomer) introduced as $R^2$ to the formula (I) is an alkyl functional group. With this structure, it is possible to impart an appropriate flexibility to the film as compared to the case where only the aromatic functional groups are introduced.

In addition, due to the structure expressed by the formula (I), the polymer electrolyte medium according to this embodiment is low in price as compared to a conventional perfluoroalkylsulfonic acid film such as Nafion.

In particular, the polymer electrolyte media expressed by the formula (II) and (III) each exhibit a high non-affinity (high resistance) to methanol, a neutralizing effect towards radical species created by the electrode reaction, and a higher resistance to the electric field.

The polymer electrolyte media expressed by the formula (II) and (III) each have a structure in which the sulfonic acid group is coupled with the phenyl group. With this structure, the media can each exhibit a proton conductivity equal to or higher than that of a conventional perfluoroalkylsulfonic acid film such as Nafion.

According to this embodiment, the polymer electrolyte medium expressed by the formula (I), with the excellent properties as described above, is interposed between the anode and cathode. With this structure, the crossover of methanol can be suppressed or inhibited, and thus methanol can be used at a high efficiency. Therefore, it becomes possible to provide a direct methanol fuel cell that can maintain a high output property over a long period of operation and has a high long-term reliability.

According to this embodiment, the polymer electrolyte medium expressed by the formula (II) or (III), with the excellent properties as described above, is interposed between the anode and cathode. With this structure, the crossover of methanol can be inhibited even more effectively, and thus methanol can be used at a higher efficiency. Therefore, it becomes possible to obtain a direct methanol fuel cell that can maintain a high output property over a long period of operation and has a higher long-term reliability.

Synthesis examples and Examples of the polymer electrolyte medium according to the present invention will now be described in detail.

SYNTHESIS EXAMPLE 1

First, a Dimroth condenser, an oil bath, a magnetic stirrer, a stirring element and a nitrogen balloon were mounted to a two neck flask having a capacity of 100 mL. Into the two neck flask, 1.5 g ($3.02 \times 10^{-3}$ moles) of α,γ-bisdiphenylene-β-phenylallyl-benzene free radial complex (having a molecular weigh of 496), 0.48 g ($3.02 \times 10^{-3}$ moles) of 1,6-dichlorohexane (having a molecular weigh of 155), and 0.767 g ($3.02 \times 10^{-3}$ moles) of 9-phenylanthracene (having a molecular weigh of 254) were supplied together with 40 mL of tetrahydrofuran as a solvent. Further, 0.06 g ($4.5 \times 10^{-4}$ moles) of aluminum chloride (having a molecular weigh of 133) was added thereto. Then, the stirring element was rotated at a stirring rate of 200 rpm and the temperature of the oil bath was set to 50%. When an increase in the viscosity of the reaction solution was observed, the two neck flask was let stand to cool down to 40 or less, and the contents of the two neck flask was put into 100 mL of acetone, to obtain precipitates.

Thus obtained precipitates were dispensed to two sedimentation tubes each having a capacity of 100 mL and then centrifuged at 3000 rpm for 10 minutes. The supernatant liquid was removed from each tube, and 50 mL of acetone was added to each tube, which was further centrifuged 3 more times. After the centrifugal separation using 50 mL of acetone, the resultant was subjected to air drying and vacuum drying, thereby obtaining a polymerized material.

<Sulfonation Reaction>

A Liebig condenser, a stirring element, a magnetic stirrer, and an ice bath were mounted to a two neck round bottom flask having a capacity of 100 mL. Into the two neck flask, the polymerized material obtained above was supplied together with 20 mL of pyridine, and then the solution was stirred at 100 rpm for 15 minutes. Then, 2 mL of fuming sulfuric acid was added into the flask using a measuring pipet. After that, the solution was stirred at 200 rpm for 2 hours using the magnetic stirrer. The content was extracted with a dropping pipet and dropped into 100 mL of water. Thus obtained precipitates were dispensed to two sedimentation tubes each having a capacity of 100 mL and then centrifuged at 3000 rpm for 20 minutes. Then, the supernatant liquid was removed from each tube, and with 50 mL×two tubes of water, the centrifugal separation was carried out 3 more times. Lastly, another centrifugal separation using 50 mL of acetone was carried out and the resultant was subjected to air drying, thereby synthesizing a polymerized material.

The obtained polymerized material had the structural formula (A) provided below. The structural formula (A) was identified based on the infrared spectral data obtained by infrared analysis: 3040 cm$^{-1}$ (aromatic), 3080 cm$^{-1}$ (aromatic), 2924 cm$^{-1}$ (CH straight chain), 3400 cm$^{-1}$ (sulfonic acid), 1850 cm$^{-1}$ (sulfonic acid) and 2400 cm$^{-1}$ (C=C).

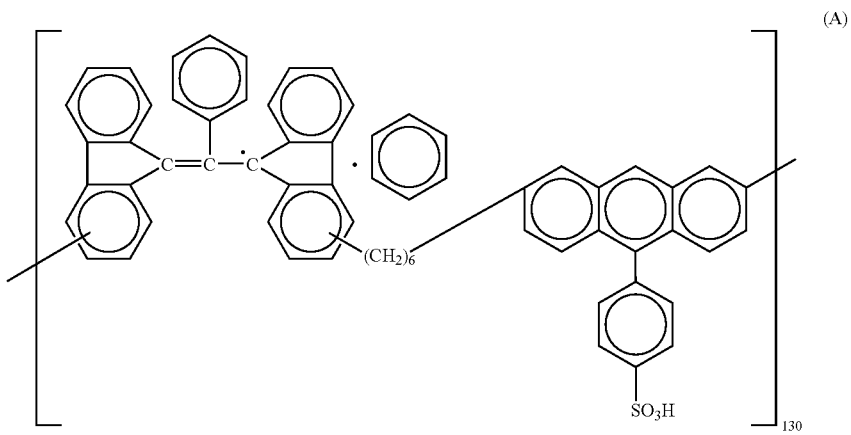

(A)

SYNTHESIS EXAMPLE 2

A polymerized material was synthesized by substantially the same method as that used in Synthesis Example 1 except that 1.5 g ($2.9 \times 10^{-3}$ moles) of α,γ-bisdiphenylene-β-p-methylphenylallyl-methylbenzene free radical complex (having a molecular weigh of 510), 0.57 g ($2.9 \times 10^{-3}$ moles) of 1,8-dichlorooctane (having a molecular weigh of 197), and 0.59 g ($2.9 \times 10^{-3}$ moles) of 5-phenylnaphthalene (having a molecular weigh of 204) were used in place of α,γ-bisdiphenylene-β-phenylallyl-benzene free radical complex, 1,6-dichlorohexane and 9-phenylanthracene, respectively.

The obtained polymerized material had the structural formula (B) provided below. The structural formula (B) was identified based on the infrared spectral data obtained by infrared analysis: 3050 cm$^{-1}$ (aromatic), 3070 cm$^{-1}$ (aromatic), 2945 cm$^{-1}$ (CH straight chain), 3400 cm$^{-1}$ (sulfonic acid), 1860 cm$^{-1}$ (sulfonic acid), 1640 cm$^{-1}$ (sulfonic acid) and 2300 cm$^{-1}$ (C=C).

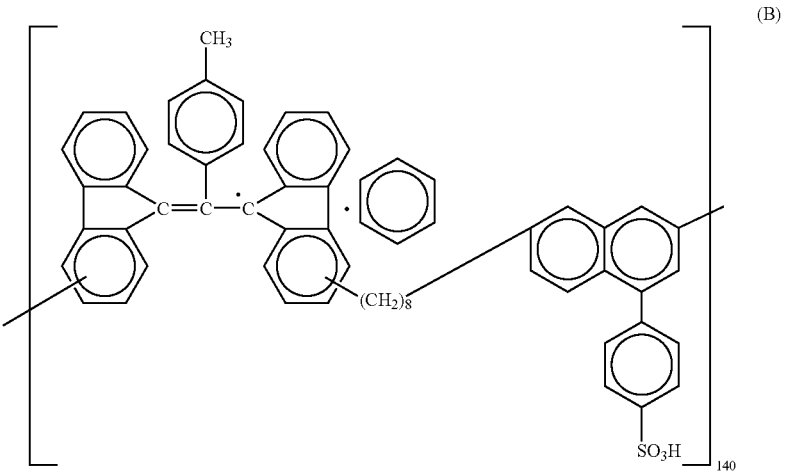

(B)

SYNTHESIS EXAMPLE 3

A polymerized material was synthesized by substantially the same method as that used in Synthesis Example 1 except that 1.5 g ($2.7 \times 10^{-3}$ moles) of α,γ-bisdiphenylene-β-p-tertiary butylphenylallyl-benzene free radical complex (having a molecular weigh of 552), 0.65 g ($2.7 \times 10^{-3}$ moles) of 1,12-dichlorododecane (having a molecular weigh of 239), and 0.42 g ($2.7 \times 10^{-3}$ moles) of 5-phenylbenzene (having a molecular weigh of 154) were used in place of α,γ-bisdiphenylene-β-phenylallyl-benzene free radial complex, 1,6-dichlorohexane and 9-phenylanthracene, respectively.

The obtained polymerized material had the structural formula (C) provided below. The structural formula (C) was identified based on the infrared spectral data obtained by infrared analysis: 3030 cm$^{-1}$ (aromatic), 3070 cm$^{-1}$ (aromatic), 2952 cm$^{-1}$ (CH straight chain), 3400 cm$^{-1}$ (sulfonic acid), 1860 cm$^{-1}$ (sulfonic acid), 1660 cm$^{-1}$ (sulfonic acid) and 2300 cm$^{-1}$ (C=C).

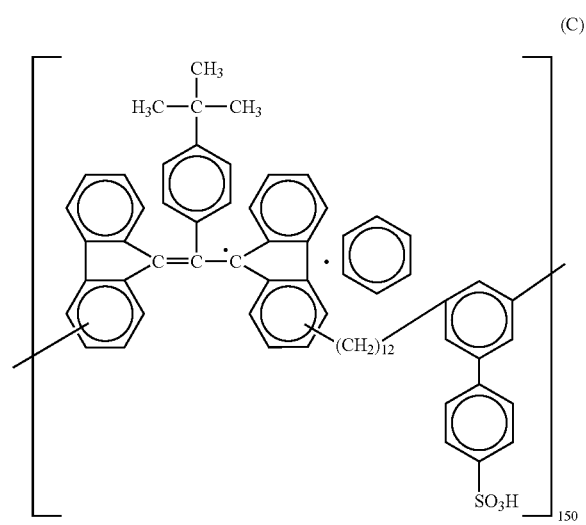

(C)

SYNTHESIS EXAMPLE 4

First, a Dimroth condenser, an oil bath, a magnetic stirrer, a stirring element and a nitrogen balloon were mounted to a two neck flask having a capacity of 100 mL. Into the two neck flask, 1.2 g ($3.0 \times 10^{-3}$ moles) of 2,2-diphenyl-1-picrylhydrazyl (having a molecular weight of 394), 0.59 g ($3.0 \times 10^{-3}$ moles) of 1,8-dichlorooctane (having a molecular weigh of 197), and 0.62 g ($3.0 \times 10^{-3}$ moles) of 4-phenylnaphthalene (having a molecular weigh of 207) were supplied, and 40 mL of tetrahydrofuran was put into a reaction chamber as a solvent. Further, 0.06 g ($4.5 \times 10^{-4}$ moles) of aluminum chloride (having a molecular weigh of 133) was added thereto. Then, the stirring element was rotated at a stirring rate of 200 rpm and the temperature of the oil bath was set to 50° C. When an increase in the viscosity of the reaction solution was observed, the two neck flask was let stand to cool down to 40° C. or less, and the contents of the two neck flask was put into 100 mL of acetone, to obtain precipitates.

Thus obtained precipitates were dispensed to two sedimentation tubes each having a capacity of 100 mL and then centrifuged at 3000 rpm for 10 minutes. The supernatant liquid was removed from each tube, and 50 mL of acetone was added to each tube, which was further centrifuged 3 more times. After the centrifugal separation using 50 mL of acetone, the resultant was subjected to air drying and vacuum drying, thereby obtaining a polymerized material.

<Sulfonation Reaction>

A Liebig condenser, a stirring element, a magnetic stirrer, and an ice bath were mounted to a two neck round bottom flask having a capacity of 100 mL. Into the two neck flask, the polymerized material obtained above was supplied together with 20 mL of pyridine, and then the solution was stirred at 100 rpm for 15 minutes. Then, 2 mL of fuming sulfuric acid was added into the flask using a measuring pipet. After that, the solution was stirred at 200 rpm for 2 hours using the magnetic stirrer. The content was extracted with a dropping pipet and dropped into 100 mL of water. Thus obtained precipitates were dispensed to two sedimentation tubes each having a capacity of 100 mL and then centrifuged at 3000 rpm for 20 minutes. Then, the supernatant liquid was removed from each tube, and with 50 mL×two tubes of water, the centrifugal separation was carried out 3 more times. Lastly, another centrifugal separation using 50 mL of acetone was carried out and the resultant was subjected to air drying, thereby synthesizing a polymerized material.

The obtained polymerized material had the structural formula (D) provided below. The structural formula (D) was identified based on the infrared spectral data obtained by infrared analysis: 3050 cm$^{-1}$ (aromatic), 3070 cm$^{-1}$ (aromatic), 2945 cm$^{-1}$ (CH straight chain), 3400 cm$^{-1}$ (sulfonic acid), 1860 cm$^{-1}$ (sulfonic acid), 1640 cm$^{-1}$, 2300 cm$^{-1}$ (C=C), 850 cm$^{-1}$, 900 cm$^{-1}$, 1000 cm$^{-1}$ (NO$_2$).

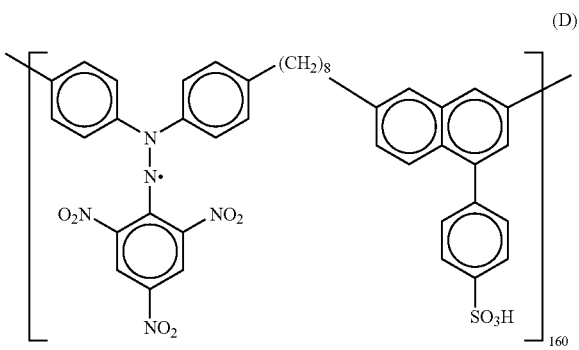

(D)

SYNTHESIS EXAMPLE 5

A polymerized material was synthesized by substantially the same method as that used in Synthesis Example 4 except that 1.5 g (3.6×10$^{-3}$ moles) of 2,2-di(3-methylphenyl)-1-picrylhydrazyl (having a molecular weigh of 422), 0.56 g (3.6× 10$^{-3}$ moles) of 1,6-dichlorohexane (having a molecular weigh of 155), and 0.91 g (3.6×10$^{-3}$ moles) of 9-phenylanthracene (having a molecular weigh of 254) were used in place of 2,2-diphenyl-1-picrylhydrazyl, 1,8-dichlorooctane and 4-phenylnaphthalene, respectively.

The obtained polymerized material had the structural formula (E) provided below. The structural formula (E) was identified based on the infrared spectral data obtained by infrared analysis: 3040 cm$^{-1}$ (aromatic), 3080 cm$^{-1}$ (aromatic), 2924 cm$^{-1}$ (CH straight chain), 3400 cm$^{-1}$ (sulfonic acid), 1850 cm$^{-1}$ (sulfonic acid), 2400 cm$^{-1}$ (C=C), 880 cm$^{-1}$, 920 cm$^{-1}$ and 1080 cm$^{-1}$ (NO$_2$).

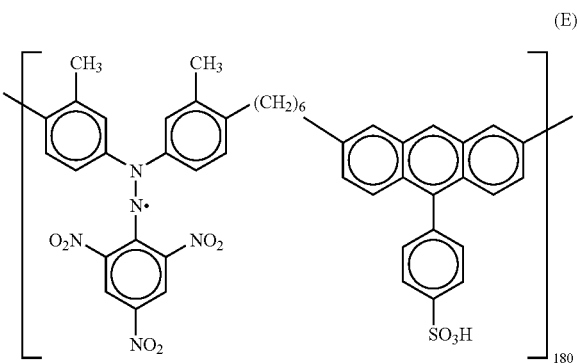

(E)

SYNTHESIS EXAMPLE 6

A polymerized material was synthesized by substantially the same method as that used in Synthesis Example 4 except that 1.5 g (2.4×10$^{-3}$ moles) of 2,2-di(4-t-octylphenyl)-1-picrylhydrazyl (having a molecular weigh of 619), 0.57 g (2.4× 10$^{-3}$ moles) of 1,12-dichlorododecane (having a molecular weigh of 239), and 0.37 g (2.4×10$^{-3}$ moles) of 4-phenylbenzene (having a molecular weigh of 154) were used in place of 2,2-diphenyl-1-picrylhydrazyl, 1,8-dichlorooctane and 5-phenylnaphthalene, respectively.

The obtained polymerized material had the structural formula (F) provided below. The structural formula (F) was identified based on the infrared spectral data obtained by infrared analysis: 3030 cm$^{-1}$ (aromatic), 3070 cm$^{-1}$ (aromatic), 2952 cm$^{-1}$ (CH straight chain), 3400 cm$^{-1}$ (sulfonic acid), 1860 cm$^{-1}$ (sulfonic acid), 1660 cm$^{-1}$ (sulfonic acid), 2300 cm$^{-1}$ (C=C), 830 cm$^{-1}$, 920 cm$^{-1}$ and 1050 cm$^{-1}$ (NO$_2$).

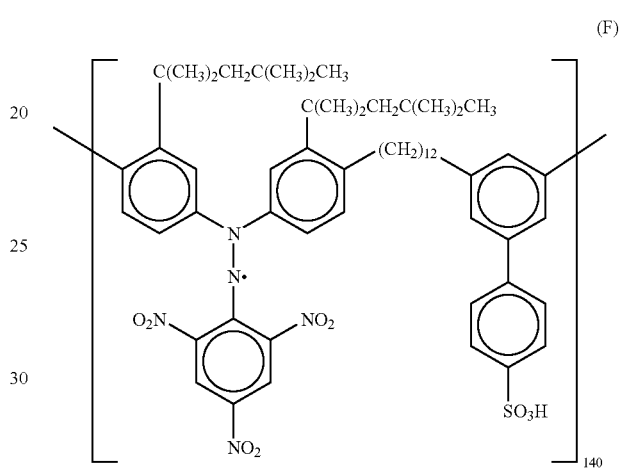

(F)

EXAMPLES 1 TO 6

Each of the polymerized materials obtained in Synthesis Examples 1 to 6 described above was dissolved into 30 mL of N,N-dimethylformamide, and the solution was spread on a glass plate using a bar coater, and then dried with air. After that, the vacuum drying was carried out for 4 hours. In each case, the cast film (high molecular electrolyte film) was peeled off with tweezers, and immersed in 0.02 mol/L of hydrochloric acid to be stored.

Thus obtained cast films of Examples 1 to 6 were evaluated in terms of the proton conductivity, resistance to radicals, methanol crossover and heat decomposition property with use of the following measurement methods.

1. Measurement of Proton Conductivity

<Manufacture of Cells for Measurement of Electro-conductivity> a-1) Two fluorine resin plate each made of polytetrafluoroethylene and having, at a central portion of the plate, a liquid reservoir piercing therethrough, with a length of 0.5 cm, a width of 1.0 cm and a depth of 1.0 cm, were prepared. A platinum foil having a thickness of 0.30 mm was cut into an electrode having a size of 0.5 cm×2.0 cm. This electrode was attached by a double-faced tape to each of the fluorine resin plates in such a manner that the 0.5 cm side of the resin plate is accurately aligned with the end side (0.5 cm) of the electrode. Then, the portion of the electrode surface from the position 0.7 cm away from the end of the liquid reservoir to the other end was covered by a protection tape adhered thereto, to adjust the electrode area to 0.35 cm$^2$.

a-2) A platinum black coating was applied to the surface of the platinum electrode by the following procedure. That is, 0.008 g of lead acetate (Pb(CH₃COO)₂.3H₂O) and 1 g of platinic chloride (H₂PtCl₆.6H₂O) were dissolved into 30 mL of 1/40N hydrochloric acid to prepare a coating solution. In the coating solution, each one of the fluoride resin plates with the platinum electrodes manufactured in the above items a-1) was immersed and a DC voltage and current generating device (a product of Advantest Corp, product name: R1644) was set to achieve conditions: a bath voltage of 3.0V, a current of 14 mA and a current density of 40 mA/cm². Then, in order to plate the two electrodes alternately and gradually, the +/−setting switch of the device is switched over at about every one minute to exchange the polarities of the +/−electrodes, and this operation was continued for 50 minutes. After that, the two electrodes were cleaned with distilled water, and one of the platinum black electrode plates and another new platinum electrode plate were immersed in 10% week sulfuric acid. Here, setting the platinum black electrode plate to (−) and the new platinum electrode plate to (+), an voltage of 3V was applied for 10 minutes, thereby removing the coating solution or adsorbed chlorine. Lastly, the electrodes were well cleaned with distilled water, and they were stored in distilled water.

b) The cast film of each of the above-described Examples 1 to 6 was cut into a size of 15 mm×12 mm, thereby preparing films to be measured in terms of electro-conductivity by an alternating current anodizing method (call-call plot). Then, a first fluorine resin plate 14a that includes a platinum electrode 12a which is partially processed by the above-described method into a platinum black coating portion 11a, and has holes 13a opened at four corners of the plate, was prepared. As shown in FIG. 2, a measurement film 16 is overlaid on a liquid reservoir 15a of the first fluorine resin plate 14 such as to cover the platinum black coating portion 11a including the liquid reservoir 15a. Next, a second fluorine resin plate 14b that includes a platinum electrode 12b which is partially processed by the above-described method into a platinum black coating portion (not shown), and has holes 13b opened at four corners of the plate, was prepared. Then, the second fluorine resin plate 14b is overlaid on the first fluorine resin plate 14a in such a manner that the liquid reservoirs 15a and 15b coincide with each other, the platinum electrode 12b extends out in an opposite direction to that of the platinum electrode 12a of the first fluorine resin plate 14a, and the platinum black coating portion is in contact with the measurement film 16. The measurement film 16 was interposed between the first and second fluoride resin plates 14a and 14b. Subsequently, bolts (not shown) are inserted respectively to the holes 13a and 13b formed at the four corners of each of the first and second fluoride resin plates 14a and 14b, and nuts are engaged respectively with the bolts to fasten the first and second fluoride resin plates 14a and 14b to each other. After that, about 0.3 mL of 0.03N hydrochloric acid aqueous solution was introduced to the liquid reservoirs 15a and 15b of the first and second fluoride resin plates 14a and 14b by utilizing a capillary phenomenon until the hydrochloric acid aqueous solution covers both surfaces of the measurement film 16 each to its entirety. Thus, an electro-conductivity measurement cell was prepared.

Similarly, as a Comparative Example 1, a film of Nafion 112 (a product by DuPont known with this tradename) was cut into a size of 15 mm×12 mm, thereby preparing films to be measured in terms of electro-conductivity by an alternating current anodizing method (call-call plot). Then, the cut piece was interposed between the first and second fluoride resin plates 14a and 14b. Subsequently, about 0.3 mL of 0.03N hydrochloric acid aqueous solution was introduced to the liquid reservoirs 15a and 15b until the hydrochloric acid aqueous solution covers both surfaces of the measurement film 16 each to its entirety. Thus, a measurement cell was prepared.

Next, the cell including the Nafion 112 film of Comparative Example 1 obtained as above was fixed onto a stand, and an impedance/gain phase analyzer SI 1260 by Solartron was connected to each of the platinum electrodes. Then, an AC current is supplied to the measurement film (Nafion film) while the frequency of the current is lowered from a high-frequency side to a low frequency side. The resistance values obtained here was plotted in a graph of a real number axis and an imaginary number axis (call-call plot). Generally, a graph of such a case indicates a semicircle drawn on the high frequency side and then a straight line that goes up on the low frequency side. The diameter of the semicircle represents the resistance of the sample. In this measurement, the radium of the semicircle was estimated and from the estimated value, the electroconductivity of the Nafion film—H type was calculated, thereby obtaining the resistance of the film. The distance in which the current flows in the film was determined by the structure of the cell, and which is 0.5 cm. Therefore, the electroconductivity of the film can be obtained from the following formula (1).

$$\text{Proton Conductivity } (\Omega^{-1} \cdot cm^{-1}) = \text{Distance between electrodes/[cross sectional area of film×resistance of film]} = 0.5 \text{ (cm)/[film width 1.0 (cm)} \times \text{film thickness (cm)} \times \text{film resistance } (\Omega)] \quad (1)$$

The proton conductivity obtained when the film of Nafion 112 was measured by the above-described method was taken for S0.

Meanwhile, the cells including the cast films of Examples 1 to 6 described above was each fixed onto a stand, and an impedance/gain phase analyzer SI 1260 of Solartron was connected to each of the platinum electrodes. Then, an AC current is supplied to the measurement film (Nafion film) while the frequency of the current is lowered from a high-frequency side to a low frequency side. The measured proton conductivities of the cast films were taken for S1, S2, S3, S4, S5 and S6, respectively. Thus, the relative ratios to the proton conductivity S0 of the film of Nafion 112, that is, S1/S0, S2/S0, S3/S0, S4/S0, S5/S0 and S6/S0 were calculated. The results are presented in Table 1 below.

2. Measurement of Methanol Crossover

Two glass-made containers connected via a solid polymer electrolyte film were prepared. One of the containers was filled with a methanol aqueous solution, and the behavior of methanol seeping to the other chamber as passing through the film was traced by collecting the gas, which was subjected to gas chromatograph analysis. More specifically, the measurement was carried out in the following manner.

Two glass tubes were prepared. Each of these was made of a one-side-sealed cylinder having an inner diameter of 4 cm and a length of 5 cm, with a rim having a width of 2 cm formed at its opening portion and a hole having an inner diameter of 6 mm opened in a body portion (side portion). A film of Nafion 112 (a product of DuPont by that tradename) was stuffed into the opening end of each glass tube. One of the glass tube (that is, the first glass tube) was filled with a 3%-concentration methanol aqueous solution, and the hole having inner diameter of 6 mm and made in the side portion of the tube was plugged with a silicon rubber stopper. The hole of the other glass tube (the second glass tube) was plugged as well with a silicon rubber stopper, and a rubber-made balloon was pinned to the stopper with a hollow needle. The time when the first and second glass tubes are butt-jointed together via the film of Nafion 112 was taken for a start of 0 second. At every 20 minutes, a micro-syringe was pierced into the silicon rubber stopper of the second glass tube to collect 20 microliter of the internal gas, which was subjected to the gas chromatograph to determine the concentration of methanol (ppm). With a horizontal axis indicating time (in minute) and a vertical axis indicating the concentration of methanol ppm), the methanol concentration was plotted against the time for 100 minutes, and the value obtained by dividing the methanol concentration by the time of 100 minutes was calculated as a methanol diffusion rate D0 (ppm/minute).

With regard to the cast films of Examples 1 to 6 described above were measured by a similar method in terms of the methanol diffusion rate, as D1, D2, D3, D4, D5 and D6 (ppm/min), respectively. Thus, the methanol diffusion rate of each of the cast film was obtained as the relative ratios to the methanol diffusion rate of the film of Nafion 112, that is, D1/D0, D2/D0, D3/D0, D4/D0, D5/D0 and D6/D0 were calculated. The results are presented in Table 1 below.

3. Measurement of Oxidizing Decomposition Property (Resistance to Radicals):

A 100-mL beaker was fixed in an oil bath and an oxidizing aqueous solution (Fenton reagent that generates OH radicals) containing a 3% hydrogen peroxide aqueous solution and 40 ppm of $FeSO_4$ was put into the beaker. Then, the temperature of the oil was adjusted to 60° C. A film of Nafion 112 (a product by DuPont known with this tradename) was cut into a size of circle with diameter of 8 cm. Then, the weight of the cut sample was measured and the measured weight was taken for W0. Subsequently, the cut sample of the film of Nafion 112 was put in the above-described oxidizing solution and let it stand still there for 10 hours. After that, the sample was pulled out of there, and subjected to water washing, air drying and vacuum drying. Then, the weight of the resultant was measured and the measured weight was taken for W1. From these weights W0 and W1, the decrement in weight, (WF0) =W0−W1, was obtained. The decrement in weight due to the oxidization decomposition can be used as a scale for measuring the resistance to radials.

Further, with regard to the cast films of Examples 1 to 6 described above were measured by a similar method in terms of the weights before and after immersing each sample in the oxidizing solution, and decrements in weight (WF1, WF2, WF3, WF4, WF5 and WF6 (ppm/min) were obtained, respectively. Thus, the measured decrement in weight of each of the cast film was obtained as the relative ratios to the decrement in weight of the film of Nafion 112, that is, WF0, and thus WF1/WF0, WF2/WF0, WF3/WF0, WF4/WF0, WF5/WF0 and WF6/WF0 were calculated. The results are presented in Table 1 below.

4. Measurement of Heat Decomposition Property:

A 10 mg sample was taken from a film of Nafion 112 (a product of DuPont known by this tradename), and the sample was measured in terms of heat decomposing temperature in nitrogen gas using a TG-DTA device (Thermo Plus 2, a product of Rigaku Corp, by its tradename). The temperature increasing rate here was 10° C./min. The measured heat decomposing temperature of the film of Nafion 112 was taken for T0 (° C.).

Further, with regard to the cast films of Examples 1 to 6 described above, a 10 mg sample was taken from each of these films, and they were measured by a similar method in terms of the heat decomposing temperature, thus obtaining T1, T2, T3, T4, T5 and T6 (° C.), respectively. Thus, the measured heat decomposing temperature of each of the cast film was obtained as the relative ratio to the heat decomposing temperature of the film of Nafion 112, and thus T1/T0, T2/T0, T3/T0, T4/T0, T5/T0 and T6/T0 were calculated. The results are presented in Table 1 below.

TABLE 1

| | Polymer electrolyte film | Proton conductivity (in relative ratio) | Methanol diffusion rate (in relative ratio) | Decrement in weight [resistance to oxidation decomposition] (in relative ratio) | Heat decomposition (in relative ratio) |
|---|---|---|---|---|---|
| Example 1 | Structural formula A | 1.1 | 0.9 | 0.9 | 1.3 |
| Example 2 | Structural formula B | 1.1 | 0.9 | 0.9 | 1.3 |
| Example 3 | Structural formula C | 1.1 | 0.8 | 0.8 | 1.3 |
| Example 4 | Structural formula D | 1.1 | 0.9 | 0.8 | 1.3 |
| Example 5 | Structural formula E | 1.1 | 0.8 | 0.8 | 1.3 |
| Example 6 | Structural formula F | 1.1 | 0.8 | 0.8 | 1.3 |

As is clear from Table 1 above, the polymer electrolyte films of Examples 1 to 6 of the present invention exhibit a higher relative proton conductivity as compared to that of the conventional film of Nafion 112 of DuPont, and thus it has been confirmed that the proton conductivity is improved by the present invention.

Further, the polymer electrolyte films of Examples 1 to 6 of the present invention exhibit a lower relative methanol diffusion rate as compared to that of the conventional film of Nafion 112 of DuPont, and thus it has been confirmed that the effect of suppressing the methanol crossover is high in the present invention.

Furthermore, the polymer electrolyte films of Examples 1 to 6 of the present invention exhibit a lower relative decrement in weight and a high relative heat decomposition property as compared to those of the conventional film of Nafion 112 of DuPont, and thus it has been confirmed that the resistance to oxidation decomposition property and resistance to heat decomposition property are high, and therefore the chemical stability is high in the present invention.

<Assembly of Single Cell>

In each of the cast films (polymer electrolyte film) of Examples 1 to 6 and the film of Nafion 112 of Comparative Example 1, a platinum-ruthenium catalyst layer and a diffusion layer containing carbon powder and carbon paper are bonded in this order on one of the surfaces by thermocompression bonding to form an anode (fuel electrode), and a platinum catalyst layer and a diffusion layer containing carbon powder and carbon paper are bonded in this order on the other surface by thermocompression bonding to form a cathode (air electrode). Thus, 7 types of film electrode units (electrode area of 5 $cm^2$) were manufactured. The catalyst supporting amount was set to 2.2 $mg/cm^2$ on the anode side, and 1.4 $mg/cm^2$ on the cathode side. Each of these film units was sandwiched between two carbon-made separators each having a serpentine flow path and two charge collectors, and they were fastened with bolts, thereby preparing 7 types of single cells to be evaluated.

Each of the single cells was mounted in a respective fuel cell evaluation device. Then, in each device, methanol fuel was supplied to the anode side of the single cell at a flow rate of 2.0 mL/min, and air was supplied to the cathode side of the single cell at a flow rate of 15 mL/min. The current-voltage curve of each single cell at a temperature of 70° C. was analyzed. The results are presented in FIG. 3.

As is clear from FIG. 3, the single cells equipped with the polymer electrolyte films of Examples 1 to 6 of the present invention exhibit higher current-voltage characteristics as compared to those of the single cell equipped with the conventional film of Nafion 112 of DuPont, and thus it has been confirmed that the direct methanol fuel cell (DMFC) of the present invention has high output characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polymer electrolyte medium expressed by the following formula (I):

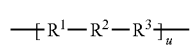
(I)

where $R^1$ in the formula represents an aromatic radical-containing functional group, $R^2$ represents an alkyl functional group, $R^3$ represents an ion exchange aromatic functional group, and u represents an integer of 1 to 450.

2. The polymer electrolyte medium according to claim 1, wherein $R^2$ of the formula (I) is an alkyl functional group having 1 to 30 carbon atoms.

3. The polymer electrolyte medium according to claim 1, wherein u of the formula (I) is an integer of 20 to 200.

4. The polymer electrolyte medium according to claim 1, expressed by the following formula (II):

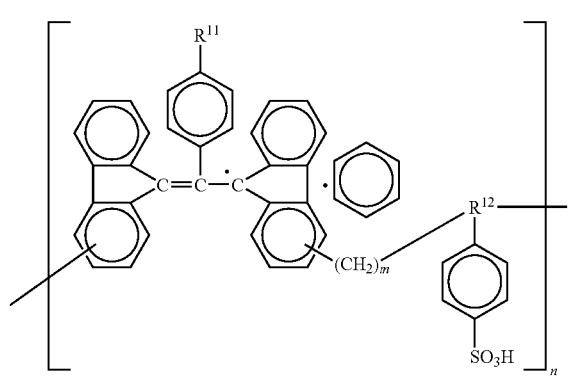
(II)

where $R^{11}$ in the formula represents a hydrogen atom or an alkyl group, $R^{12}$ represents a phenyl group, a naphthyl group or an antryl group, n represents an integer of 1 to 450 and m represents an integer of 1 to 30.

5. The polymer electrolyte medium according to claim 4, wherein the alkyl group represented by $R^{11}$ in the formula (II) is of a straight chain.

6. The polymer electrolyte medium according to claim 4, wherein n in the formula (II) is an integer of 20 to 200.

7. The polymer electrolyte medium according to claim 4, wherein m in the formula (II) is an integer of 3 to 20.

8. The polymer electrolyte medium according to claim 4, wherein n in the formula (II) is an integer of 3 to 12.

9. The polymer electrolyte medium according to claim 1, expressed by the following formula (III):

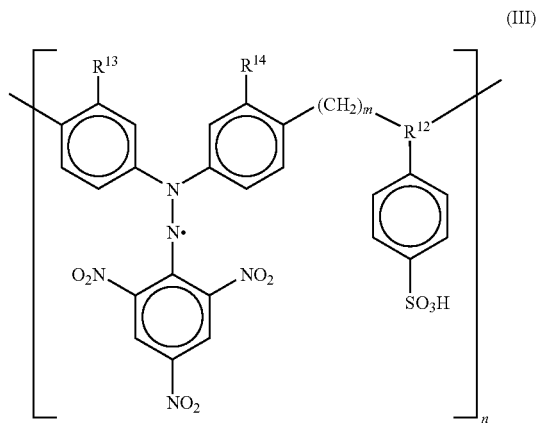
(III)

where $R^{13}$ and $R^{14}$ in the formula represents a hydrogen atom or an alkyl group, and they may be the same or different, $R^{12}$ represents a phenyl group, a naphthyl group or an antryl group, n represents an integer of 1 to 450 and m represents an integer of 1 to 30.

10. The polymer electrolyte medium according to claim 9, wherein the alkyl groups represented by $R^{13}$ and $R^{14}$ in the formula (III) is of a straight chain.

11. The polymer electrolyte medium according to claim 9, wherein n in the formula (III) is an integer of 20 to 200.

12. The polymer electrolyte medium according to claim 9, wherein m in the formula (III) is an integer of 3 to 20.

13. The polymer electrolyte medium according to claim 9, wherein n in the formula (III) is an integer of 3 to 12.

14. A direct methanol fuel cell comprising:
an anode to which a methanol aqueous solution is supplied;
a cathode to which an oxidizing agent is supplied; and
a polymer electrolyte medium interposed between the anode and cathode and expressed by the following formula (I):

(I)

where $R^1$ in the formula represents an aromatic radical-containing functional group, $R^2$ represents an alkyl functional group, $R^3$ represents an ion exchange aromatic functional group, and u represents an integer of 1 to 450.

15. The direct methanol fuel cell according to claim 14, wherein $R^2$ of the formula (I) is an alkyl functional group having 1 to 30 carbon atoms.

16. The direct methanol fuel cell according to claim 14, wherein u of the formula (I) is an integer of 20 to 200.

17. The direct methanol fuel cell according to claim 14, wherein the polymer electrolyte medium is expressed by the following formula (II):

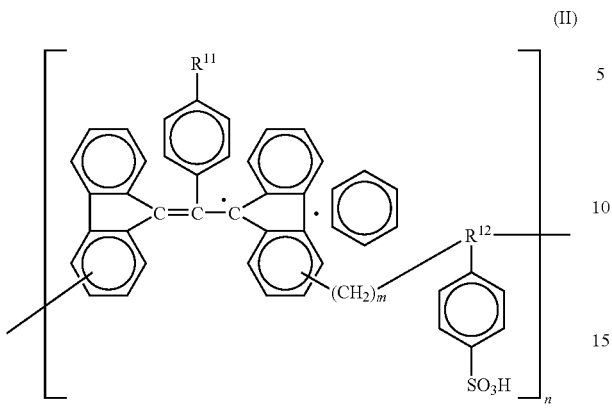 (II)

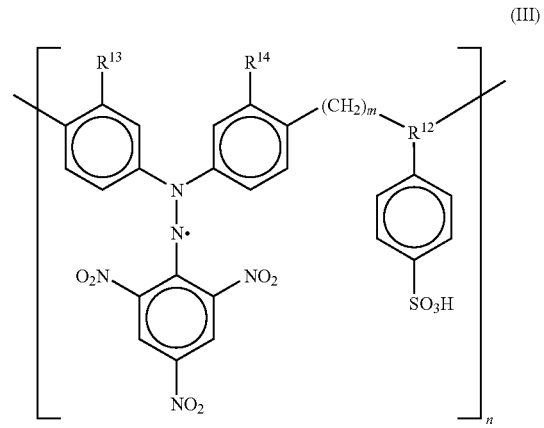 (III)

where $R^{11}$ in the formula represents a hydrogen atom or an alkyl group, $R^{12}$ represents a phenyl group, a naphthyl group or an antryl group, n represents an integer of 1 to 450 and m represents an integer of 1 to 30.

18. The direct methanol fuel cell according to claim 17, wherein the alkyl group represented by $R^{11}$ in the formula (II) is of a straight chain, and m is an integer of 3 to 20.

19. The direct methanol fuel cell according to claim 14, wherein the polymer electrolyte medium is expressed by the following formula (III):

where $R^{13}$ and $R^{14}$ in the formula represents a hydrogen atom or an alkyl group, and they may be the same or different, $R^{12}$ represents a phenyl group, a naphthyl group or an antryl group, n represents an integer of 1 to 450 and m represents an integer of 1 to 30.

20. The direct methanol fuel cell according to claim 19, wherein the alkyl groups represented by $R^{13}$ and $R^{14}$ in the formula (III) each is of a straight chain, and m is an integer of 3 to 20.

* * * * *